United States Patent
Liu et al.

(10) Patent No.: US 11,347,308 B2
(45) Date of Patent: May 31, 2022

(54) METHOD AND APPARATUS WITH GAZE TRACKING

(71) Applicant: Samsung Electronics Co., Ltd., Suwon-si (KR)

(72) Inventors: Yongchao Liu, Beijing (CN); Hui Zhang, Beijing (CN); Xiabing Liu, Beijing (CN); Byung In Yoo, Seoul (KR); Chang Kyu Choi, Seongnam-si (KR); Jaejoon Han, Seoul (KR); Youngjun Kwak, Seoul (KR); Tianchu Guo, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/937,722

(22) Filed: Jul. 24, 2020

(65) Prior Publication Data
US 2021/0026446 A1   Jan. 28, 2021

(30) Foreign Application Priority Data

Jul. 26, 2019 (CN) .......................... 201910685032.2
Apr. 20, 2020 (KR) ........................ 10-2020-0047423

(51) Int. Cl.
| | |
|---|---|
| *G06F 3/01* | (2006.01) |
| *G06N 3/08* | (2006.01) |
| *G06F 3/14* | (2006.01) |
| *G06K 9/62* | (2022.01) |
| *G06V 40/16* | (2022.01) |

(52) U.S. Cl.
CPC ................ *G06F 3/013* (2013.01); *G06F 3/14* (2013.01); *G06K 9/6256* (2013.01); *G06N 3/082* (2013.01); *G06V 40/161* (2022.01)

(58) Field of Classification Search
CPC ....... G06F 3/013; G06F 3/14; G06K 9/00228; G06K 9/6256; G06K 9/00597; G06N 3/082; G06N 3/0454; G06N 3/084; G06V 40/161; G06V 10/82; G06V 40/18
See application file for complete search history.

(56) References Cited

U.S. PATENT DOCUMENTS

| | | | | |
|---|---|---|---|---|
| 7,538,744 | B1* | 5/2009 | Liu .......................... | G06F 3/013 345/7 |
| 9,618,965 | B2* | 4/2017 | Kumar ............. | G01R 31/31709 |
| 10,466,780 | B1* | 11/2019 | Ellis ........................ | G06F 3/013 |
| 10,671,156 | B2* | 6/2020 | Wu ..................... | G06K 9/00248 |

(Continued)

FOREIGN PATENT DOCUMENTS

| | | |
|---|---|---|
| CN | 106355248 A | 1/2017 |
| CN | 108334832 A | 7/2018 |

(Continued)

*Primary Examiner* — Grant Sitta
(74) *Attorney, Agent, or Firm* — NSIP Law

(57) ABSTRACT

A gaze tracking method and apparatus, and a gaze tracking neural network training method and apparatus are provided. The gaze tracking apparatus includes one or more processors and a memory, and the one or more processors obtain output position information from an input face image of a user using a neural network model, determines a position adjustment parameter for the user, and predicts gaze position information of the user by adjusting the output position information based on the position adjustment parameter.

12 Claims, 7 Drawing Sheets

(56) References Cited

U.S. PATENT DOCUMENTS

| | | | | |
|---|---|---|---|---|
| 10,740,985 B2* | 8/2020 | Sommerlade | | G06N 3/0454 |
| 10,750,160 B2* | 8/2020 | Sommerlade | | G06F 3/011 |
| 10,819,898 B1* | 10/2020 | Han | | H04N 5/23212 |
| 10,891,478 B2* | 1/2021 | Kononenko | | G06N 5/003 |
| 10,914,951 B2* | 2/2021 | Liu | | G06F 3/0304 |
| 11,003,243 B2* | 5/2021 | Ren | | G06F 3/013 |
| 11,017,575 B2* | 5/2021 | Sommerlade | | A63F 13/213 |
| 2014/0361996 A1* | 12/2014 | Eden | | G06F 3/013 |
| | | | | 345/173 |
| 2015/0116493 A1* | 4/2015 | Bala | | G06V 40/171 |
| | | | | 348/148 |
| 2017/0053304 A1 | 2/2017 | Eskilsson et al. | | |
| 2017/0308770 A1* | 10/2017 | Jetley | | G06K 9/4671 |
| 2017/0364149 A1* | 12/2017 | Lu | | G06F 3/013 |
| 2019/0038130 A1* | 2/2019 | Lawrence | | A61B 5/163 |
| 2019/0080474 A1* | 3/2019 | Lagun | | G06F 3/013 |
| 2019/0130184 A1* | 5/2019 | Samanta | | G02B 27/0093 |
| 2019/0180723 A1* | 6/2019 | Pohl | | G06F 3/013 |
| 2019/0317598 A1* | 10/2019 | Aleem | | G06F 3/013 |
| 2019/0324532 A1* | 10/2019 | Aleem | | G02B 27/0103 |
| 2020/0134867 A1* | 4/2020 | Zachrisson | | G02B 27/017 |

FOREIGN PATENT DOCUMENTS

| | | |
|---|---|---|
| JP | 2019-508803 A | 3/2019 |
| KR | 10-2017-0085582 A | 7/2017 |
| KR | 10-2019-0005045 A | 1/2019 |

* cited by examiner

METHOD AND APPARATUS WITH GAZE TRACKING

CROSS-REFERENCE TO RELATED APPLICATION(S)

This application claims the benefit under 35 USC 119 (a) of Chinese Patent Application No. 201910685032.2 filed on Jul. 26, 2019, in the China National Intellectual Property Administration and Korean Patent Application No. 10-2020-0047423 filed on Apr. 20, 2020, in the Korean Intellectual Property Office, the entire disclosures of which are incorporated herein by reference for all purposes.

BACKGROUND

1. Field

The following description relates to a method and apparatus with gaze tracking.

2. Description of Related Art

Gaze tracking technology may be used in various applications. For example, to perform an action of an application using a gaze, gaze position information may be obtained from a face image of successive frames. A gaze tracking apparatus may desire to accurately predict gaze position information in real time. Gaze tracking may be performed in real-time, and thus a higher level or greater accuracy in gaze tracking may be implemented in real-time processing. Additionally, gaze tracking may be performed successively, and thus confirmation of continuity of gaze position information corresponding to each successive frame may be desires. Also, lessening or inhibiting of jitters that may occur when the user focuses on the same point or an area around the point may be desired.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented method includes obtaining output position information from an input face image of a user using a neural network model; determining a position adjustment parameter for the user; and predicting gaze position information of the user by adjusting the output position information based on the position adjustment parameter.

The determining of the position adjustment parameter may include displaying an adjustment object; obtaining an adjusted face image of the user corresponding to the adjustment object; predicting adjusted position information from the adjusted face image using the neural network model; and determining the position adjustment parameter based on the adjusted position information and a position of the adjustment object.

In a general aspect, a processor-implemented method includes obtaining output position information by inputting an input face image of a user to a neural network model; calculating a loss value of the output position information; calculating a reliability of the output position information based on the calculated loss value; and predicting gaze position information of the user based on the calculated reliability.

The predicting of the gaze position information based on the calculated reliability may include determining the output position information to be the gaze position information in response to the calculated reliability meeting a threshold; and determining the gaze position information by adjusting the output position information in response to the calculated reliability failing to meet the threshold.

The predicting of the gaze position information based on the calculated reliability may include determining the output position information to be the gaze position information in response to the reliability meeting a threshold; and determining, to be the gaze position information, output position information obtained from an input face image of a previous frame of the user in response to the reliability failing to meet the threshold.

The calculating of the reliability of the output position information based on the calculated loss value may include determining at least two perturbations dependent on the calculated loss value; obtaining at least two adjusted face images respectively corresponding to the at least two perturbations by respectively adjusting the input face image; obtaining at least two sets of perturbed position information by inputting the at least two adjusted face images to the neural network model; and calculating the reliability of the output position information based on the at least two sets of perturbed position information.

The calculating of the reliability of the output position information based on the at least two sets of the perturbed position information may include calculating a standard deviation based on the at least two sets of perturbed position information; and determining an inverse value of the standard deviation to be the reliability.

The determining of the at least two perturbations may include calculating a loss value in each of at least two directions of the output position information; and determining the at least two perturbations in the at least two directions based on the loss value in each of the at least two directions.

The determining of the at least two perturbations may include determining the at least two perturbations based on at least two perturbation coefficients.

The obtaining of the output position information may include obtaining a partial face image from the input face image as a full face image; obtaining the output position information and partial position information by respectively inputting the input face image and the partial face image to the neural network model; determining at least two perturbations for each of a loss value of the output position information and a loss value of the partial position information; obtaining at least four adjusted face images by adjusting the input face image and the partial face image using the at least two perturbations corresponding to the loss value of the output position information and the at least two perturbations corresponding to the loss value of the partial face image; obtaining at least four sets of perturbed position information by inputting the at least four adjusted face images to the neural network model; and calculating the reliability of the output position information based on the at least four sets of the perturbed position information.

In a general aspect, a processor-implemented method includes obtaining a third training dataset by removing noise from a first training dataset; and training the neural network model by applying pruning and reinitiating based on the third training dataset, wherein the neural network model is trained such that a loss value of gaze position information predicted from a plurality of training face images included in the third training dataset is minimized.

The removing of the noise may include training the neural network model once using the first training dataset; calculating a first loss value of each of the plurality of training face images using the neural network model; obtaining a second training dataset by deleting, from the first training dataset, training face images by a deletion number or a deletion ratio in an order starting from training the neural network model twice using the second training dataset; calculating a second loss value of each of the training face images using a neural network model after the training once and a neural network model after the training twice; and obtaining the third training dataset by deleting, from the first training dataset, training face images by the deletion number or the deletion ratio in an order starting from a training face image with a greatest second loss value.

The training of the neural network model may include obtaining at least one output vector by inputting a training face image included in the third training dataset to at least one prior learning model; and training the neural network model based on the at least one output vector of the training face image.

The training of the neural network by applying pruning and reinitiating based on the third training dataset may include pruning a filter selected from a plurality of filters included in the neural network model based on an importance level of each of the filters; and reinitiating the pruned filter.

The pruning may include calculating the importance level of each of the filters; and selecting a filter by a pruning ratio in an order starting from a filter with a lowest importance level.

The reinitiating may include obtaining an orthogonal matrix by decomposing a filter parameter matrix of a layer included in the neural network model in which the pruned filter is positioned; determining a feature vector corresponding to the pruned filter based on the orthogonal matrix; and determining a parameter of the pruned filter based on a L2-norm of the feature vector.

In a general aspect, an apparatus includes one or more processors configured to obtain output position information from an input face image of a user using a neural network model; determine a position adjustment parameter for the user; and predict gaze position information of the user by adjusting the output position information based on the position adjustment parameter.

The apparatus may further include a memory storing instructions that, when executed by the one or more processors, configure the one or more processors to perform the obtaining of the output position information, the determining a position adjustment parameter, and the predicting gaze position information.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
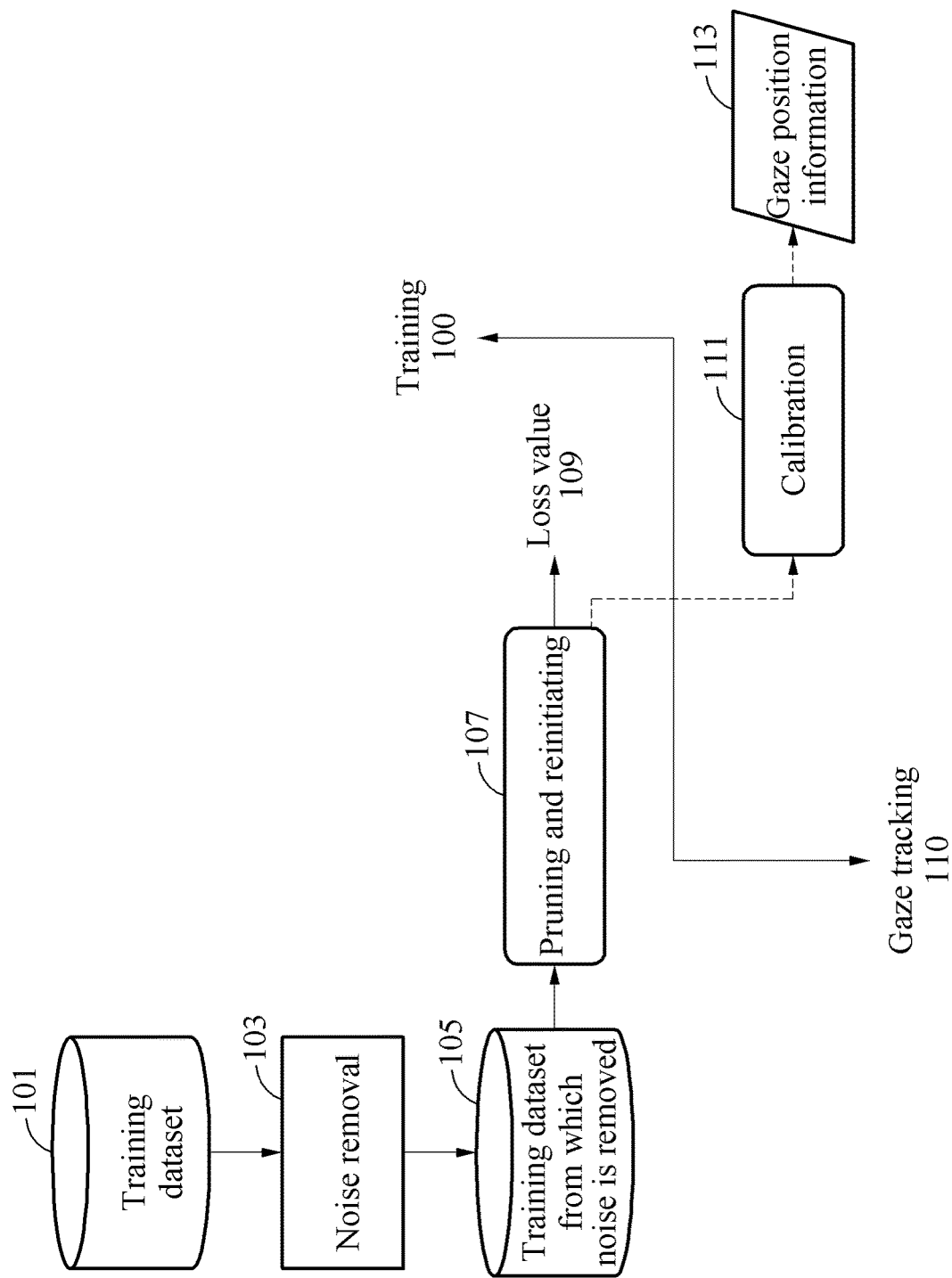
FIG. 1 illustrates an example training of a neural network model for gaze tracking and gaze tracking with a trained neural network model, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. The articles "a," "an," and "the" are intended to include the plural forms as well, unless the context clearly indicates otherwise. The term "and/or" includes any one and any combination of any two or more of the associated listed items. The terms "include," "comprise," and "have" specify the presence of stated features, numbers, operations, elements, components, and/or combinations thereof, but do not preclude the presence or addition of one or more other features, numbers, operations, elements, components, and/or combinations thereof.

As used herein, the term "and/or" includes any one and any combination of any two or more of the associated listed items Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, similar expressions, for example, "between" and "immediately between," and "adjacent to" and "immediately adjacent to," are also to be construed in the same way.

Unless otherwise defined, all terms, including technical and scientific terms, used herein have the same meaning as commonly understood in the art to which the disclosure of this application pertains based on an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Hereinafter, examples will be described in detail with reference to the accompanying drawings, and like reference numerals in the drawings refer to like elements throughout.

FIG. 1 illustrates an example training of a neural network model for gaze tracking and gaze tracking implementing such a trained neural network model.

In an example, a gaze tracking apparatus may track a gaze of a user from a face image of the user. The gaze tracking apparatus may predict position information of the gaze of the user from the face image of the user using a neural network model. The gaze tracking apparatus may track the gaze of the user by inputting the face image of successive frames to the neural network model. The position information of a gaze may also be referred to herein as gaze position information.

In an example, a gaze tracking method may be implemented as, or in, various electronic devices such as, but not limited to, a mobile electronic device including, for example, a cellular phone and a tablet personal computer (PC) that have a single visible-light camera. In an example, an example cellular phone may track a gaze of a user based on a video and/or an image. Such a gaze tracking method may effectively improve the performance of an interaction between the cellular phone and the gaze of the user. For example, the cellular phone may obtain user data such as a photo image through a camera of the cellular phone, and track a point on a screen of the cellular phone at which the user gazes based on the user data. In the following description, "gaze tracking" may include eye-tracking and head-tracking. Specifically, gaze tracking is associated with the determination of the gaze direction of a user, based on movement of the eyes of the user.

The gaze tracking apparatus may be applied to all fields of application that utilize gaze position information. For example, the gaze tracking apparatus may use a gaze or eyes of a user as a pointer of a mouse to select or execute an application program. For example, the gaze tracking apparatus may consider whether an image, for example, an advertisement, is displayed in a line-of-sight of a gaze of a user. The gaze tracking apparatus may be applied to various fields of application in which a position where a user focuses on or gazes, or an object on which a user focuses or gazes is determined. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Referring to FIG. 1, in a training process 100, a training apparatus may remove noise from an original training dataset 101 in operation 103 to improve the accuracy and stability of gaze tracking, and trains a neural network model using a training dataset 105 from which the noise is removed. The training dataset 105 from which the noise is removed is input to the neural network model and a loss value 109 is output. The training apparatus may train the neural network model such that the loss value 109 is reduced.

The neural network model may be obtained based on a training method to be described hereinafter. Through the training method, the neural network model may output gaze position information of a user. In the training process 100, an output of the neural network model may be gaze position information predicted from a sample image, which indicates a coordinate of a user's gaze at a point on a screen, for example, of an electronic device displaying the sample image.

The training apparatus may perform preprocessing on a training dataset to improve accuracy to be obtained after training the neural network model. The training apparatus may remove noise from the training dataset. The training apparatus may filter out a faulty sample image from the training dataset, and may train the neural network model based on a better sample image, thereby increasing accuracy in gaze tracking.

Referring again to FIG. 1, the training may include training the neural network through pruning parameters and reinitiating in operation 107 to prevent or reduce overfitting. Traditionally, overfitting may be due to biased or excessive training, which may lead to a reduction in a performance of the neural network. By pruning the neural network, it is possible to remove or alleviate unnecessary parameters that may cause such overfitting. Thus, the final training, as well as the performance of neural networks, may be enhanced through the pruning of the neural network. The pruning may support and provide functionality to perform both coarse-grained neural network pruning (for example, the pruning of channels, kernels, or nodes from the neural network model), as well as more surgical, fine-grained neural network pruning (for example, the pruning of individual weights from the neural network model). Additionally, the training apparatus may improve stability in an output of the neural network model, and reduce jitters using a method of classifying a loss function based on counter-learning.

In an example, the training apparatus may apply pruning to resolve an overfitting issue. The training apparatus may optimize training or learning using a cosine similarity-based pruning module and an aligned orthogonal initialization module, and improve accuracy and stability of the neural network model.

Referring again to FIG. 1, in a gaze tracking process 110, the gaze tracking apparatus may adjust gaze position information in a posteriori manner in operation 111 to improve accuracy and stability in gaze tracking. The adjusting performed in operation 111 may also be referred to as calibration. The gaze tracking apparatus may adjust the gaze position information rapidly and effectively using a three-point calibration method, or a single point or multi-point calibration method. The gaze tracking apparatus may obtain a standard deviation and a prediction result of a counter sample of a face image, and output more accurate gaze position information 113 by processing the prediction result using the standard deviation.

Figure 2:
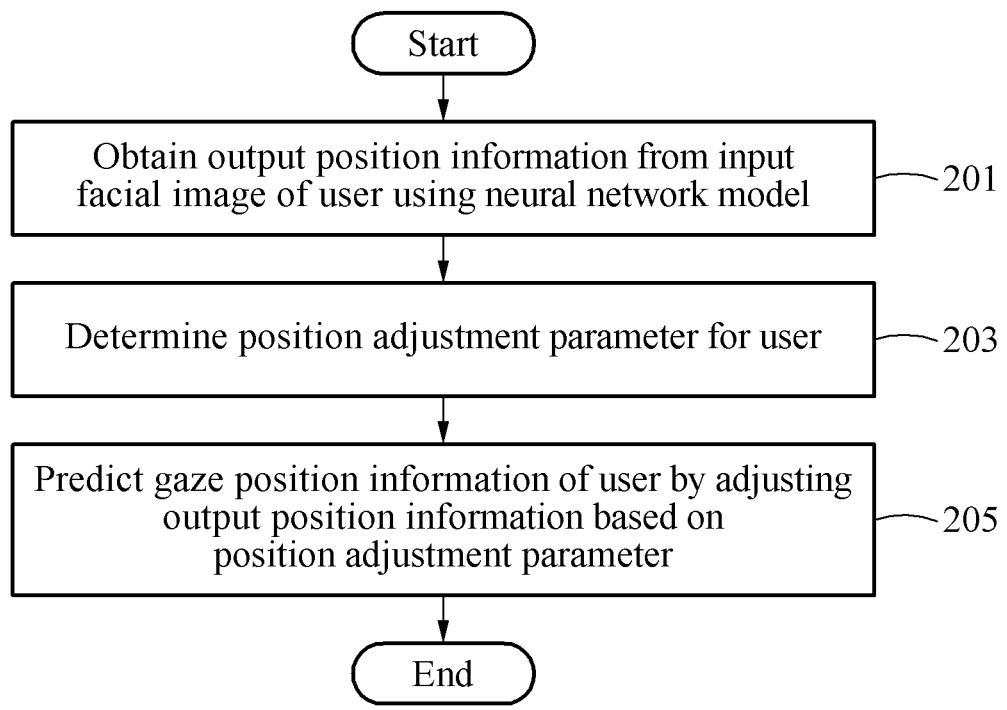
FIG. 2 is a flowchart illustrating an example gaze tracking method, in accordance with one or more embodiments.

FIG. 2 is a flowchart illustrating an example gaze tracking method, in accordance with one or more embodiments. The operations in FIG. 2 may be performed in the sequence and manner as shown. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 is also applicable to FIG. 2, and are incorporated herein by reference. Thus, though applicable, the above description may not be repeated here.

Referring to FIG. 2, in operation 201, a gaze tracking apparatus obtains output position information from an input face image of a user using a neural network model. The gaze tracking apparatus may obtain the input face image of the user using, as non-limiting examples, a camera or a communication device. The gaze tracking apparatus may obtain the output position information by inputting the input face image to the neural network model.

In operation 203, the gaze tracking apparatus determines a position adjustment parameter for the user. The gaze tracking apparatus may display an adjustment object. The adjustment object may include three points, for example. The number of points is not limited to the foregoing example, and the points may be a single point or multiple points. Additionally, the adjustment object is not limited to a certain type, and various types of objects that attract a gaze of the user may be used as the adjustment object.

The gaze tracking apparatus may obtain an adjusted face image of the user corresponding to the adjustment object. When the adjustment object is displayed, the user may focus on the adjustment object, and gaze on at least one point included in the adjustment object. The gaze tracking apparatus may obtain a face image of the user that gazes at the adjustment object through a device such as, as an example, a camera and the like, e.g., of the gaze tracking apparatus. The gaze tracking apparatus may predict adjusted position information from the adjusted face image using the neural network model. The gaze tracking apparatus may determine the position adjustment parameter based on the adjusted position information and a position of the adjustment object.

For example, in an example of a scenario in which the adjustment object includes three points, a position adjustment parameter $F(x)$ may be determined as follows. The gaze tracking apparatus may display a feature point on a display, and induce the user to gaze at the feature point. The gaze tracking apparatus may obtain n (n≥1) adjusted face images each time a feature point is displayed through the camera. In an example, n is greater than or equal to 1 (n≥1). The gaze tracking apparatus may record positions of the points as g1, g2, and g3.

The gaze tracking apparatus may predict adjusted position information of each of the adjusted face images by inputting, to the neural network model, the adjusted face images for the points. The adjusted position information may be indicated as p1, p2, and p3 that respectively correspond to g1, g2, and g3. For example, when n>1, p1, p2, and p3 may indicate a mean value of outputs of the n adjusted face images for each of the three points.

The gaze tracking apparatus may determine the position adjustment parameter $F(x)$ based on p1, p2, p3, g1, g2, and g3. For example, the position adjustment parameter $F(x)$ may be determined as represented by Equation 1 below.

$$F(x) = \begin{cases} \dfrac{g1-p1}{p1}x, & 0 \le x < p1 \\ \dfrac{(g2-p2)-(g1-p1)}{p2-p1}(x-p1)+(g1-p1), & p1 \le x < p2 \\ \dfrac{(g3-p3)-(g2-p2)}{p3-p2}(x-p2)+(g2-p2), & p2 \le x < p3 \\ \dfrac{(g3-p3)}{p3-scr}(x-scr), & p3 \le x < scr \end{cases} \quad \text{Equation 1}$$

In Equation 1, x denotes output position information to be adjusted. scr denotes a preset maximum position. Additionally, x denotes a coordinate in a horizontal direction. In an example of adjusting a position in a vertical direction, the position may be adjusted through a position adjustment parameter $F(y)$ that is the same as in Equation 1.

Referring again to FIG. 2, in operation 205, the gaze tracking apparatus predicts gaze position information of the user by adjusting the output position information based on the position adjustment parameter. Through the gaze tracking method described above, accuracy of the gaze position information may be improved.

Referring to Equation 1, the gaze tracking apparatus may adjust an x-coordinate of the output position information to $x+F(x)$, and a y-coordinate of the output position information to $y+F(y)$.

Figure 3:
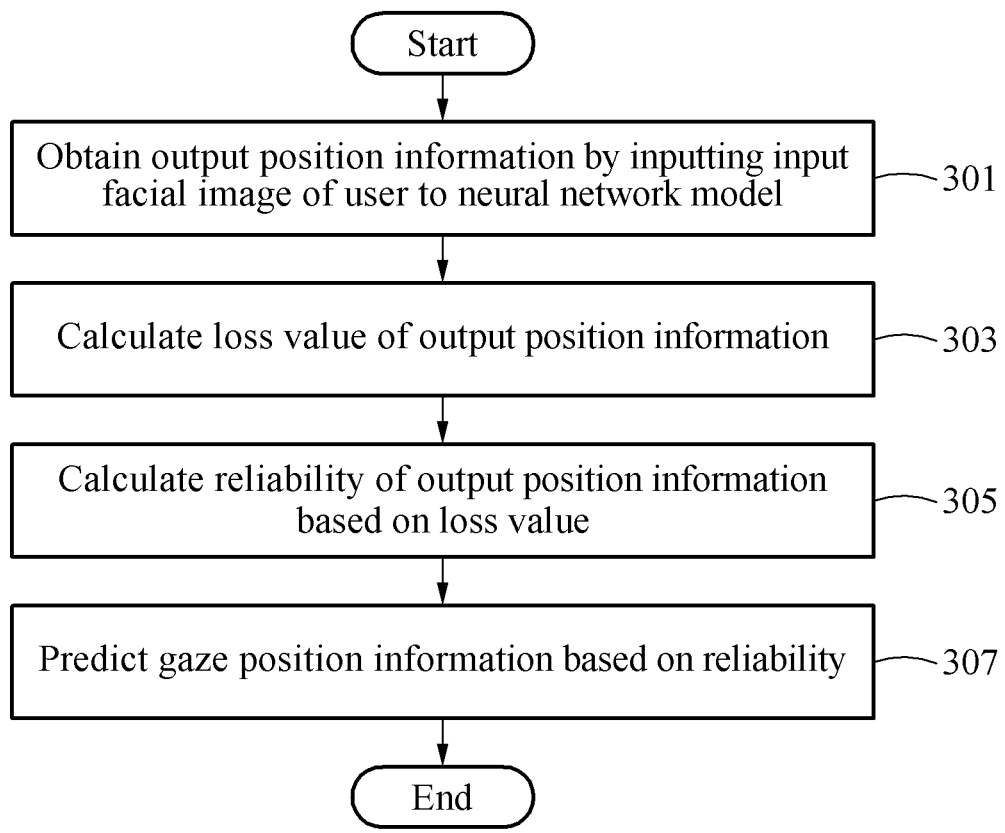
FIG. 3 is a flowchart illustrating an example gaze tracking method, in accordance with one or more embodiments.

FIG. 3 is a flowchart illustrating another example of a gaze tracking method. The operations in FIG. 3 may be performed in the sequence and manner as shown. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, though applicable, the above description may not be repeated here.

Referring to FIG. 3, in operation 301, a gaze tracking apparatus obtains output position information by inputting an input face image of a user to a neural network model. In operation 303, the gaze tracking apparatus calculates a loss value of the output position information. During the training, parameters of the neural network (e.g., weights of connections between nodes at the different layers) may be updated to minimize the loss function by minimizing the difference between true and predicted gaze point distances.

In operation 305, the gaze tracking apparatus calculates a reliability of the output position information based on the loss value. The gaze tracking apparatus may determine at least two perturbations for the loss value. The gaze tracking apparatus may determine the at least two perturbations in different directions, or determine the at least two perturbations using perturbation coefficients. In an example, the gaze tracking apparatus may determine the at least two perturbations in at least two directions based on a loss value of each of the directions. In another example, the gaze tracking apparatus may determine the at least two perturbations based on at least two perturbation coefficients.

The gaze tracking apparatus may obtain at least two adjusted face images respectively corresponding to the at least two perturbations by adjusting the input face image. The gaze tracking apparatus may obtain at least two sets of perturbed position information by inputting the at least two adjusted face images to the neural network model.

The gaze tracking apparatus may calculate the reliability of the output position information based on the at least two sets of the perturbed position information. The gaze tracking apparatus may calculate a standard deviation based on the at least two sets of the perturbed position information. The gaze tracking apparatus may determine an inverse value of the standard deviation to be the reliability.

In operation 307, the gaze tracking apparatus predicts gaze position information of the user based on the reliability. In an example, in response to the reliability being greater than a threshold value, the gaze tracking apparatus may determine the output position information to be the gaze position information. In this example, in response to the reliability being less than or equal to the threshold value, the gaze tracking apparatus may determine the gaze position information by adjusting the output position information.

In another example, in response to the reliability being greater than the threshold value, the gaze tracking apparatus may determine the output position information to be the gaze position information. In this example, in response to the reliability being less than or equal to the threshold value, the gaze tracking apparatus may determine, to be the gaze position information, output position information that is obtained from an input face image of a previous frame of the user.

In another example, the gaze tracking apparatus may generate an additional image from the input face image, and may use the generated additional image for gaze tracking. In this example, the gaze tracking apparatus may obtain a partial face image from the input facial image. The gaze tracking apparatus may cut the input face image to obtain an entire image of the face image and a partial image of the face image. The gaze tracking apparatus may input the input face image and the partial face image to the neural network model, and obtain output position information and partial position information, respectively.

In this example, the gaze tracking apparatus may determine at least two perturbations for each of a loss value of the output position information and a loss value of the partial position information. The gaze tracking apparatus may obtain at least four adjusted face images by adjusting the input face image and the partial face image using the at least two perturbations corresponding to the loss value of the output position information and the at least two perturbations corresponding to the loss value of the partial position information. The gaze tracking apparatus may adjust each of the entire image and the partial image based on the at least two perturbations corresponding to each of the entire image and the partial image, and then obtain at least two adjusted images corresponding to each of the entire image and the partial image. In an example, each image and corresponding at least two adjusted images may form one group.

The gaze tracking apparatus may obtain at least four sets of perturbed position information by inputting the at least four adjusted face images to the neural network model. The gaze tracking apparatus may calculate a reliability of the output position information based on the at least four sets of the perturbed position information. The gaze tracking apparatus may input an adjusted image of each group to the neural network model, and obtain predicted gaze position information corresponding to the adjusted image of each group. The gaze tracking apparatus may obtain the reliability based on output position information corresponding to the adjusted image of each group.

Hereinafter, operations of the gaze tracking apparatus will be described in detail.

The gaze tracking apparatus may obtain a partial face image from an input facial image X. For example, the input face image X may be cut into partial face images, for example, a face image Xf, a left-eye image Xl, and a right-eye image Xr. The three images may be adjusted to be of predetermined sizes through bilinear interpolation. For example, the face image Xf, the left-eye image Xl, and the right-eye image Xr may be adjusted to be, as non-limiting examples, 64p×64p, 48p×64p, and 48p×64p in size, respectively. In this example, p indicates pixel. The face image Xf may be construed as being an entire image, and the left-eye image Xl and the right-eye image Xr may be construed as being partial images.

The gaze tracking apparatus may obtain output position information Px by inputting the three images to a neural network model. The output position information Px may be a feature vector corresponding to a gaze position in the input face image X, and a dimension of Px may be bin_num. In a total number of vector elements corresponding to the number of neurons included in an output layer of the neural network model, a value of a first element of Px may be represented as Pxi.

The gaze tracking apparatus may determine various perturbations based on Pxi. For example, a perturbation corresponding to the face image Xf may be represented as $p_{fjgl}^{adv}$, in which f corresponds to a full face image and l corresponds to a direction. l may have two types of values: 1 and 2, in which 1 denotes a left-side perturbation and 2 denotes a right-side perturbation. g and j denote perturbation coefficients.

The gaze tracking apparatus may obtain various perturbations $p_{fjgl}^{adv}$ for the face image Xf based on Pxi. Through this, the gaze tracking apparatus may obtain various counter images (or adjusted face images) which may be represented as $X_{fjkl}^{adv}=X_f+p_{fjkl}^{adv}$. The gaze tracking apparatus may obtain an adjusted face image $X_{fjkl}^{adv}$ by overlapping each perturbation and a pixel value of the face image Xf.

$$\text{Loss\_test\_l}_i = -\text{Log}(1 - P_{xi}) \qquad \text{Equation 2}$$

$$\text{Loss\_test\_r}_i = -\text{Log}(P_{xi})$$

$$\text{Loss\_test\_l} = \sum_{i=p\_bin-k}^{p\_bin+k} \text{Loss\_test\_l}_i$$

$$\text{Loss\_test\_r} = \sum_{i=p\_bin-k}^{p\_bin+k} \text{Loss\_test\_r}_i$$

$$p_{fig1}^{adv} = \alpha_j rdm(\text{sgn}(\nabla_{x_f}\text{Loss\_test\_l}), pos_g)$$

$$p_{fig2}^{adv} = \alpha_j rdm(\text{sgn}(\nabla_{x_f}\text{Loss\_test\_r}), pos_g)$$

$$rdm(M, pos_g)_{nm} = \begin{cases} M_{nm}, & \text{random}(\,) \leq pos_g \\ 0, & \text{random}(\,) > pos_g \end{cases}$$

In Equation 2, Loss_test_$l_i$ denotes a loss value of an i-th element in a left direction, and Loss_test_$r_i$ denotes a loss value of the i-th element in a right direction. In an example, Loss_test_l denotes a loss value in the left direction corresponding to an entirety of output position information, and Loss_test_r denotes a loss value in the right direction corresponding to the entirety of the output position information. K is a set value. For example, when K is 4, a value of 2K+1 may be construed as not being greater than a total number of neurons in the output layer. P_bin denotes the number of last elements (neurons) greater than the set value, for example, 0.5, in the Px vector. $p_{fjk1}^{adv}$ denotes a left-side perturbation and $p_{fjk2}^{adv}$ denotes a right-side perturbation. $\bar{v}x_f$ denotes a Laplacian operator, $\alpha_j$ denotes a step size, j indicates taking a different value, and $\alpha_j$ also denotes a different step size. For example, of the two options for a step size, $\alpha_1=1$ and $\alpha_2=2$, a value of j may be 1 or 2. In this example, $p_{f1g1}^{adv}$ denotes a left-side perturbation corresponding to step 1 and $p_{f2g1}^{adv}$ denotes a left-side perturbation corresponding to step 2. sgn( ) denotes a sign function. $pos_g$ denotes a possibility or probability, and $pos_g$ for a different value of g is a different possibility or probability. There are three options for a probability, for example, $pos_1=1$, $pos_2=0.8$, and $pos_3=0.6$. That is, a value of g may be 1, 2, or 3. In such an example, $p_{f111}^{adv}$ denotes a left-side perturbation corresponding to step 1 and a probability of 1, and $p_{f121}^{adv}$ denotes a left-side perturbation corresponding to step 1 and a probability of 0.8.

$rdm(M, pos_k)_{nm}$ denotes a random back-off element of a probability of $pos_k$ in a matrix M, and is provided to describe a meaning of a function rdm( ). When random( )≤$pos_g$, a function result is a corresponding element value. When random( )>$pos_g$, an element value is 0. For rdm(sgn($\bar{v}_{x_f}$Loss_test_1),$pos_g$), this element indicates that there is a perturbation at some pixel positions and there is no perturbation at some pixel positions by selecting whether a perturbation is generated at each pixel position with a probability of $pos_g$. For example, when random( )>$pos_g$ at a position (m, n), a position value of (m, n) in an obtained matrix may be 0, and a perturbation at the position may be 0.

Reliability calculation may be obtained based on an inverse value of a counter standard deviation std adv.

A counter standard deviation may be represented by Equation 3 below.

$$\text{mean} = \frac{1}{N} \sum_{s=1}^{N} Pred_{jgl}^{adv}$$

$$\text{var} = \frac{1}{N} \sum_{s=1}^{N} L2\_dis(Pred_{jgl}^{adv}, \text{mean})^2$$

$$\text{std\_adv} = \sqrt{\text{var}}$$

Equation 3

In Equation 3, N denotes a total number of counter images corresponding to each of the three images, that is, for example, j*g*l. $Pred_{jgl}^{adv}$ denotes predicted gaze position information corresponding to a counter image (or an adjusted image) of each group. For different values j, g, and l, $Pred_{jgl}^{adv}$ corresponds to predicted gaze position information of a counter image of each corresponding group. Additionally, mean denotes a mean value, and var denotes a variance. Each $Pred_{jgl}^{adv}$ corresponds to a counter image of each group, and a counter image of each group may include a single counter image corresponding to each of the three images (face image, left-eye image, and right-eye image). Thus, the three counter images may be considered an input group of the neural network model, and each input group may correspond to adjusted output position information. The gaze tracking apparatus may input a total of N groups and obtain N $Pred_{jgl}^{adv}$, and calculate a standard deviation based on the N $Pred_{jgl}^{adv}$. The gaze tracking apparatus may obtain a reliability by taking an inverse value of this standard deviation.

Based on a counter standard deviation, output position information Px of a single frame image X may be processed differently. In an example, an input may be output position information Px of an image and a reliability of 1/std_adv, and an output may be gaze position information obtained after the processing.

In an example, when 1/std_adv is greater than a threshold value th1, 1/std_adv indicates that the reliability of a prediction result for the image is high and the output position information Px of the image may be output directly. However, when 1/std_adv is not greater than the threshold value th1, 1/std_adv indicates that the reliability of the prediction result for the image is low, and temporal smoothing such as Kalman filtering is applied to the output position information Px. In this example, the threshold value th1 may be set to be, for example, 1/63.88, according to an actual environment.

The gaze tracking apparatus may calculate the reliability based on the standard deviation. For example, when std_adv is less than or equal to a threshold value th2, std_adv indicates that a counter standard deviation of the prediction result of the image is low, the reliability is high, and the output position information Px of the image is output directly. However, when std_adv is greater than the threshold value th2, std_adv indicates that the reliability of the prediction result of the image is low and temporal smoothing such as Kalman filtering is applied to the output position information Px. In this example, the threshold value th2 may be set to be, for example, 63.88, according to an actual environment.

Figure 4:
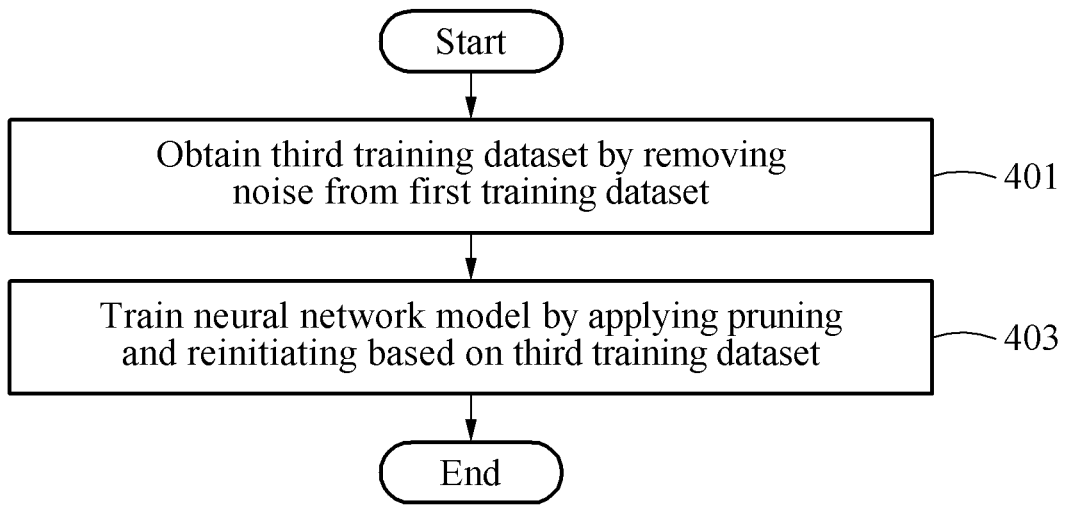
FIG. 4 is a flowchart illustrating an example training method of training a neural network model for gaze tracking, in accordance with one or more embodiments.

FIG. 4 is a flowchart illustrating an example gaze tracking neural network training method, in accordance with one or more embodiments.

In an example, a training apparatus may increase an amount of training datasets. The training apparatus may train a neural network model based on each sample image. The training apparatus may determine a loss value of the neural network model for a determined sample image, and obtain an adjusted sample image by adjusting the sample image based on the determined loss value. The training apparatus may then train the neural network model based on the adjusted sample image. A sample image may refer to a training face image and will be hereinafter interchangeably used with a training face image.

The training apparatus may determine a loss value of a target neural network model for each sample image. The training apparatus may determine a gradient change in a loss value for each pixel of each sample image. The training apparatus may determine a perturbation of a loss value for each pixel based on a gradient change corresponding to each pixel. The training apparatus may obtain an adjusted sample image by overlapping a perturbation corresponding to each pixel and an original pixel value of each sample image.

Referring to FIG. 4, in operation 401, the training apparatus obtains a third training dataset by removing noise from a first training dataset. The first training dataset refers to a training dataset from which noise is not removed, and the third training dataset refers to a training dataset from which the noise is removed from the first training dataset.

The training apparatus may perform a single training operation on the neural network model using the first training dataset. The training apparatus may calculate a first loss value of each of a plurality of training face images using the neural network model. The training apparatus may obtain a second training dataset by deleting, from the first training dataset, training face images by a predetermined deletion number in an order starting from a training face image with a smallest first loss value. The training apparatus may train the neural network model twice using the second training dataset. The training apparatus may calculate a second loss value of each of the training face images using the neural network model after the single training operation and the neural network model after the training operation that is performed twice. The training apparatus may obtain the third training dataset by deleting, from the first training dataset, training face images by a deletion ratio in an order starting from a training face image with a greatest second loss value. In an example, the foregoing numbers of times of the training, for example, the training operation that is performed twice, is provided as an example, and the training may be repeated M times, in which M is a natural number greater than or equal to 3.

The training apparatus may obtain the neural network model after each time of the training by performing the training at least twice on the neural network model based on each sample image. The training apparatus may store a parameter of the neural network model after each time of the training. The training apparatus may output output position information of each sample image through the neural network model after each time of the training. The training apparatus may delete a faulty sample image from the first training dataset based on a difference between the output position information corresponding to each sample image and a ground truth of each sample image. The first training dataset may include sample images that are remained after a deletion number or a deletion ratio of sample images of which a difference between a prediction result and a ground truth is relatively small is deleted among sample images used for previous training. After repeating a process of training the neural network model while gradually deleting or removing sample images with relatively less noise, the training apparatus obtains the third training dataset by deleting, from the first training dataset, sample images with a greater loss value of the neural network model by the deletion number of the deletion ratio.

The training apparatus may thus improve a quality of training data by removing the noise from the first training dataset using such a repetitive filtering method. For example, the first training dataset may include N sample images (x_i, i=1, . . . , N), a ground truth of each sample image is gt_i, the number of repetitions of training is M (M≥2), and the deletion number of sample images that are deleted or removed each time is N/M, that is, Nd=N/M. The number of sample images to be used for subsequent training is obtained by subtracting Nd from the number of current sample images.

The training apparatus may initialize a parameter of the neural network model. The training apparatus may select a loss function, and initialize a learning rate, for example, 0.01. In an example, the training apparatus may select AlexNet as the neural network model structure or framework. The loss function may include an ordinal loss. The loss function may also include other loss functions.

The training apparatus may train the neural network model once with the first training dataset, and store a parameter of the trained neural network model.

The training apparatus obtains a predicted value y_i for each sample image x_i in the first training dataset, and an error between the predicted value y_i and a ground truth, err_i=distance(x_i, y_i), using the neural network model.

The training apparatus may obtain the error by calculating a Euclidean distance. The error is aligned in ascending order.

The training apparatus may select Nd sample images with a smallest error and delete them from the first training dataset to obtain the second training dataset. A size of the second training dataset is N−Nd*t, in which t denotes a current number of repetitions of training. The training apparatus may adjust the learning rate and perform subsequent training.

In an example, when N−Nd*t is not 0, the training apparatus may repeat the foregoing process. Until N−Nd*t becomes 0, or until the training is repeated M times, the training apparatus may repeat the foregoing process.

The training apparatus calculates a predicted value of N sample images in the first training dataset using all the M parameters of the neural network model that are stored each time of M repetitions of training, and calculates an error between the predicted value and a ground truth (or an actual value). Accordingly, each sample image may have M errors. The training apparatus aligns N errors obtained from the same neural network model in ascending order, and obtains a total of M sequences. In each of the M sequences, there are N errors, which indicates an error of the neural network model for all the samples. For example, when a sample image x is positioned at r % behind an M sequence, x may be considered a noisy sample, and the training apparatus may delete x from a training dataset to obtain a third training dataset. In this example, the third training dataset may be a training dataset after N*r % noise is removed from among N samples.

In an example, the training apparatus may improve accuracy in training using an overfitting reduction method. Referring to FIG. 4, in operation 403, the training apparatus trains the neural network model by applying pruning and reinitiating based on the third training dataset.

The training apparatus obtains at least one output vector by inputting a training face image included in the third training dataset to at least one prior learning model. The training apparatus trains the neural network model based on the at least one output vector for the training face image.

In an example, the training apparatus inputs each sample image to the prior learning model, and obtains an output result for each sample image. The training apparatus may set the output result to be an actual result for each sample image, and train the neural network based on the set result. In an example, the prior learning model may be a learning model that is selected randomly from a queue. The training apparatus may add, to the queue, a neural network model after training each time. When the queue is empty, the actual result for each sample image may be set to be an initially indicated label (or a ground truth) for each sample image.

The training apparatus may train the neural network model by applying pruning and reinitiating based on the third training dataset. The training apparatus may prune some filters that are selected based on an importance of each filter among a plurality of filters included in the neural network model, and reinitiate the pruned filters.

An algorithm of the training in operation 403 may be represented as in Table 1 below. For example, the training apparatus may set the neural network model to be net, and the parameter to be W. The number of repetitions is K, and the number of repetitions of passing through training data is L. A pruning ratio is defined as a ratio between a total number of the filters of the model and the number of filters for which a network parameter should be redefined. The pruning ratio is denoted as p %. A pruning speed is defined as a ratio between a total number of filters of a corresponding layer of the neural network model and the number of filters for which a network parameter needs to be redefined. A maximum pruning speed of each layer is denoted as p_max %.

The queue is initially empty, and the training apparatus may initialize a parameter of net.

TABLE 1

```
For k = 1,2...K do {
    For l = 1,2...L do {
If a queue (teacher_network_list) is not empty: {
select a model from the queue (teacher_model in teacher_network_list),
and set it to be
a prior learning model Tnet (teacher)
y' = Tnet(x), obtain corresponding y' for all sample images x
}
Else{
y' = y, y is an actual label (ground truth) of sample image x.
}
set (x, y') to be an input pair (that is, a prediction result for x of a
neural network model
(student) needs to be y'), repeatedly optimize a parameter W of the
neural network
model (student) net that is a target for training to minimize a loss function
(Here, for an
optimization algorithm, an existing algorithm may be selected, or a
training method to
improve robustness that is to be described hereinafter may be selected.)
} //eNd for (l)
add, to the queue, the optimized neural network model (student) and the
parameter W.
perform pruning on W, and pruned parameter is W' and remaining
parameter is W-W'.
perform reinitiating Re-init on W' and indicate it as Wr.
set an initialization parameter for net using Wr (reinitiated parameter)
and W-W'
(pruned parameter).
} //eNd for (k)
```

Finally, the training apparatus outputs, as a training result, a last network model in the queue.

Hereinafter, pruning will be described in detail.

The training apparatus calculates an importance level of each of a plurality of filters. The training apparatus may select filters by a pruning ratio in an order starting from a filter having a lowest importance.

A filter parameter of each layer of a neural network model is WF and a form thereof is (Nout, C, Kw, Kh), in which Nout denotes the number of filters in a corresponding layer, C denotes the number of input channels, and Kw and Kh respectively denote a width and a height of a filter of the layer. The form of WF is adjusted to Nout one-dimensional (1D) vectors $Wf_i$, i=1, ..., Nout, and a dimension of each of Nout 1D vectors is C*Kw*Kh (a vector of which a row number is 1 and a column number is C*Kw*Kh). Here, Nout denotes the number of filters in the layer.

The training apparatus calculates a normalized $\hat{W}f_i$ (i-th filter) based on Equation 4. For a norm, a Euclidean norm may be selected, or other normalization methods may be employed.

Equation 4

$$\hat{Wf_i} = \frac{Wf_i}{\|Wf_i\|} \quad (1)$$

The training apparatus calculates Simf based on Equation 5. Here, Simf denotes a score of all filters in all layers k. Simf={$Simf_k$, k=1, ... Layer_num}, and Simf is a set of all the layers.

Equation 5

$$Simf_k = \left\{ \frac{1}{Nout} \sum_{j=1}^{Nout} A_{i,j}, i = 1, \ldots, Nout \right\} \quad (2)$$

$$A_{i,j} = \text{dot\_product}(\vec{\hat{Wf_i}}, \vec{\hat{Wf_j}})$$

In Equation 5, Layer_num denotes the number of layers of a neural network model. $Simf_k$ corresponds to Simf of each filter of a K-th layer, and $Simf_k$ corresponds to a single set. For example, when, in Simf of each filter of each layer, the number of filters of the K-th layer is Nout, $Simf_k$ corresponds to a Simf set having Nout. In addition, based on a $\hat{W}f_i$ of an i-th filter of one layer and $\hat{W}f_j$ of a j-th filter of the layer, a correlation between the two network parameters may be obtained through a dot_product($\hat{W}f_i$, $\hat{W}f_j$) of the two. Based on the foregoing method, the training apparatus calculates a total number Nout of network parameter correlations between the i-th filter and each filter of the layer in which the i-th filter is included. Additionally, based on $$\frac{1}{Nout} \sum_{j=1}^{Nout} A_{i,j},$$

Simf of the i-th filter is obtained. Simf of each filter indicates an importance of each filter, and the greater the Simf, the lower the importance.

The training apparatus may align Simf of each filter in ascending order, and cut p % filters from behind in an order starting from one with a smallest Simf. The cut filters are W'. A ratio of the cut filters of each layer is not greater than p_max %.

The training apparatus may reinitiate a pruned filter. The training apparatus obtains an orthogonal matrix by decomposing a filter parameter matrix of a layer included in the neural network model in which the pruned filter is positioned. The training apparatus determines a feature vector corresponding to the pruned filter based on the orthogonal matrix. The training apparatus determines a parameter of the pruned filter based on an L2-norm of the feature vector.

The training apparatus trains the neural network model based on each sample image. The training apparatus initializes a determined number of model parameters of a target neural network model after training each time, and considers other model parameters and the initialized model parameters to be new model parameters of the neural network model, and then performs subsequent training with the new model parameters.

The training apparatus initializes a model parameter of each target filter. The training apparatus decomposes a filter parameter matrix of a layer in which the target filter is positioned, and obtains an orthogonal matrix of the filter parameter matrix. The training apparatus determines a feature vector corresponding to each target filter in the orthogonal matrix corresponding to the layer, based on a position of each target filter in the layer. The training apparatus determines an L2-norm of the feature vector of each target filter in the same layer, based on the feature vector corresponding to each target filter. The training apparatus determines a parameter after initializing the target filter based on the feature vector corresponding to each target filter and the L2-norm corresponding to the layer in which the target filter is included.

The training apparatus performs a QR decomposition on a filter parameter WF of each layer of W, and obtains an orthogonal matrix Worth. The training apparatus obtains a matrix Worth' in a same size as W' based on a value of a position corresponding to W'. Each Worth' is calculated independently from each layer.

The training apparatus calculates a batch normalization (BN) parameter of W and a parameter Wpra' after being aggregated, independently from each filter, as represented by Equation 6 below.

$$Wpra' = \frac{W' \cdot BN_{scale}}{\sqrt{BN_{var}}} \qquad \text{Equation 6}$$

In Equation 6, BNscale and BNvar are BN parameters. BNscale denotes a network coefficient of a BN layer, and BNvar denotes a variance of network parameters of the BN layer. When the BN layer is not connected after a convolutional layer, such a BN calculation may be omitted.

The training apparatus calculates an L2-norm $\text{norm}_{k,i}$ (an L2-norm of an i-th filter of a k-th layer) of each line of Wpra', and stores a maximum value and a minimum value of all L2-norms obtained from each layer. The maximum value and the minimum value are denoted as max_norm and min_norm, respectively.

The training apparatus calculates a reinitiated weight $Wr_{k,i}$ for each filter of each layer as represented by Equation 7 below.

$$W_{rk,i} = \frac{Worth'_{k,i}}{\|Worth'_{k,i}\|_2} \cdot scalar_{aligned} \qquad \text{Equation 7}$$

In Equation 7, $scalar_{aligned}$ (min_norm, max_norm) may be sampled from a uniform distribution.

Subsequently, the training apparatus trains the neural network model such that a loss value of gaze position information predicted from a plurality of training face images included in the third training dataset is reduced. The training apparatus trains the neural network model based on each sample image until a loss function converges, and obtains the trained neural network model. The training of the neural network may include utilizing training images that are diverse with respect to the locations of gaze points relative to a two-dimensional (2D) plane of an image capture device that is used to capture the training images. In an example, some of the training images may show a user's eyes that gazed at gaze points located in the 2D planes of the image capture device, while other training images may show a user's eyes that gazed at gaze points outside of the 2D planes, in an example.

In an example, the trained neural network may be used in various embodiments gaze tracking systems including, but not limited to, gaze tracking systems that are integrated with different types of smartphones, tablets, laptops, wearable headset devices (e.g., virtual reality and augmented reality headsets), and standalone gaze tracking systems, as non-limiting different embodiments. Further, the system may be adapted for three-dimensional (3D) applications or systems such as stereoscopic displays.

Figure 5:
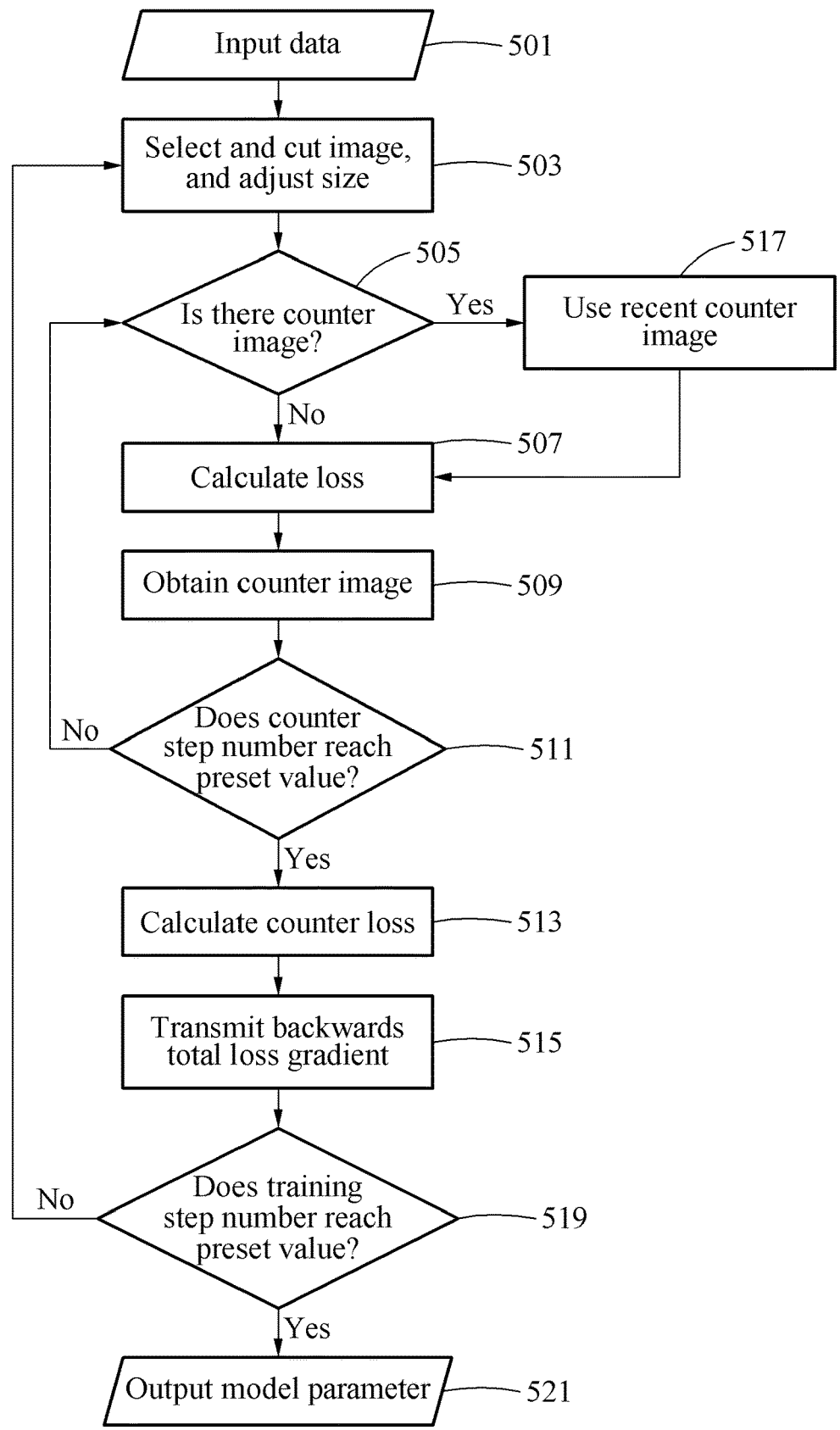
FIG. 5 is a flowchart illustrating an example gaze tracking neural network training method, in accordance with one or more embodiments.

FIG. 5 is a flowchart illustrating an example gaze tracking neural network training method, in accordance with one or more embodiments. The operations in FIG. 5 may be performed in the sequence and manner as shown. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

In an example, a training apparatus may effectively improve robustness of a neural network model. A method of improving the robustness may be used solely or used in combination with an overfitting reduction method, or used based on a result obtained based on the overfitting reduction method. The result obtained based on the overfitting reduction method may be used as an initial value. Hereinafter, a training method that may effectively improve the robustness of the neural network model will be described.

Referring to FIG. 5, in operation 501, the training apparatus inputs an input face image X included in a training dataset. In an example, the training apparatus may generate three images from the input face image X, for example, a face image Xf (entire image), a left-eye image Xl (partial image), and a right-eye image Xr (partial image), based on a result of detecting facial feature points. In operation 503, the training apparatus adjusts sizes of the three images through linear interpolation and outputs the three images of the adjusted sizes. In an example, the sizes of the three images may be 64×64, 48×64, and 48×64, respectively.

In operation 505, the training apparatus determines whether a counter image, or an adjusted image, is generated in a training process. When the counter image is not generated, the training apparatus may output the original three images. When the counter image is generated, the training apparatus outputs the most recent three counter images in operation 517.

The training apparatus inputs the three images to the neural network model, and calculates output position information Px (or an output position information representing vector)=f(Xf, Xl, Xr). In operation 507, the training apparatus calculates and outputs a loss value using a loss function as represented by Equation 8 below.

$$Loss_i = -Y_{xi} * \text{Log}(P_{xi}) - (1 - Y_{xi}) * \text{Log}(1 - P_{xi}) \qquad \text{Equation 8}$$

$$Loss = \sum_{i=1}^{bin\_num} Loss_i$$

In Equation 8, i denotes an i-th element of the vector Px or Y'x. bin_num denotes a total number of elements. Y'x denotes an accurate output value (or a ground truth) corresponding to an input image.

In operation 509, the training apparatus calculates a gradient of a loss value of each of the three images using Equation 9 below, and obtains counter perturbations $p_f^{adv}$, $p_l^{adv}$, and $p_r^{adv}$ of three groups.

$$Loss\_ctr = \sum_{i=p\_bin-k}^{p\_bin+k} Loss_i \qquad \text{Equation 9}$$

$$p_f^{adv} = \alpha \, \text{sgn}(\nabla x_f Loss\_ctr)$$

In Equation 9, p_bin denotes the number of a last element in the Px vector that is greater than a set value, which may be 0.5, for example. The training apparatus obtains three counter images $X_f^{adv}$, $X_l^{adv}$, and $X_r^{adv}$ by adding images corresponding to the counter perturbations of the three groups. α denotes a super parameter which indicates a step size, and may be selectively 1.0, for example. $\bar{v}_{x_f}$ denotes a Laplacian operator, and sgn( ) denotes a sign function. K denotes a set value which may be 4, for example. A value of 2K+1 may not be greater than a total number of nodes (or neurons) in an output layer of the neural network model. A gradient change of all pixels of an image may be calculated based on $p_f^{adv} = \alpha \ \text{sgn}(\bar{v}_{x_f} \text{Loss\_ctr})$. Such reference to "neurons" is not intended to impart any relatedness with respect to how the neural network architecture computationally maps or thereby intuitively recognizes information, and how a human's neurons operate. In other words, the term "neuron" is merely a term of art referring to the hardware implemented nodes of a neural network, and will have a same meaning as a node of the neural network.

In operation 511, the training apparatus determines whether a counter step number reaches a preset step value. When the counter step number does not reach the preset step value, the training apparatus returns to operation 505 and performs operations up to the determining operation using the three counter images as an input. When the counter step number reaches the preset step value, the training apparatus moves to operation 513. The preset step value may be 3, for example.

In operation 513, the training apparatus calculates a counter loss Loss_adv by inputting the three counter images to the neural network model. Here, the counter loss may be calculated using the same method as when calculating a loss Loss, and the input images may be replaced with Xfadv, Xladv, and Xradv.

In operation 515, the training apparatus inputs the counter loss Loss_adv and the loss Loss and determines, to be a total loss, a weighted sum of the two types of the losses based on a preset percentage c, as represented as Loss_total=c*Loss+(1−c)*Loss_adv. The training apparatus obtains a gradient for all parameters of the neural network model, and transmits the gradient backwards. Here, the percentage c may be 80%, for example.

In operation 519, the training apparatus determines whether the training process reaches a preset upper limit step value s. When the training process does not reach the upper limit step value s, the training apparatus repeats operations 501 through 515 to determine again whether the training process reaches the upper limit step value s. In operation 521, when the training process reaches the upper limit step value s, the training apparatus outputs a parameter of the neural network model and terminates the training process. The upper limit step value s may be 200000, for example.

A result obtained when the training apparatus trains the neural network model as described above may be indicated as in Table 2 below. A test was performed on databases GAZE_CN_DB and GAZE_STARE_DB.

TABLE 2

| Method | Performance | Description | Remarks |
|---|---|---|---|
| Training method in related arts | Error 241 pixels, Standard deviation 89.66 pixels | General learning method | Large variance, Large jitter in actual effect prediction |
| Training method described herein | Error 256 pixels, Standard deviation 63.88 pixels | Counter learning using steps | Variance reduced greatly, Actual jitter reduced considerably |

In Table 2 above, the error of 241 pixels indicates that the number of pixels corresponding to a deviation between a predicted coordinate (predicted gaze position information) and an actual coordinate (actual gaze position information) is 241. Additionally, the standard deviation of 63.88 indicates that a standard deviation calculated based on a predicted deviation of each test sample is 63.88. Referring to Table 2, in comparison with the existing training method, the neural network model obtained by the training method described herein may effectively improve the stability of prediction results in terms of performance.

Figure 6:
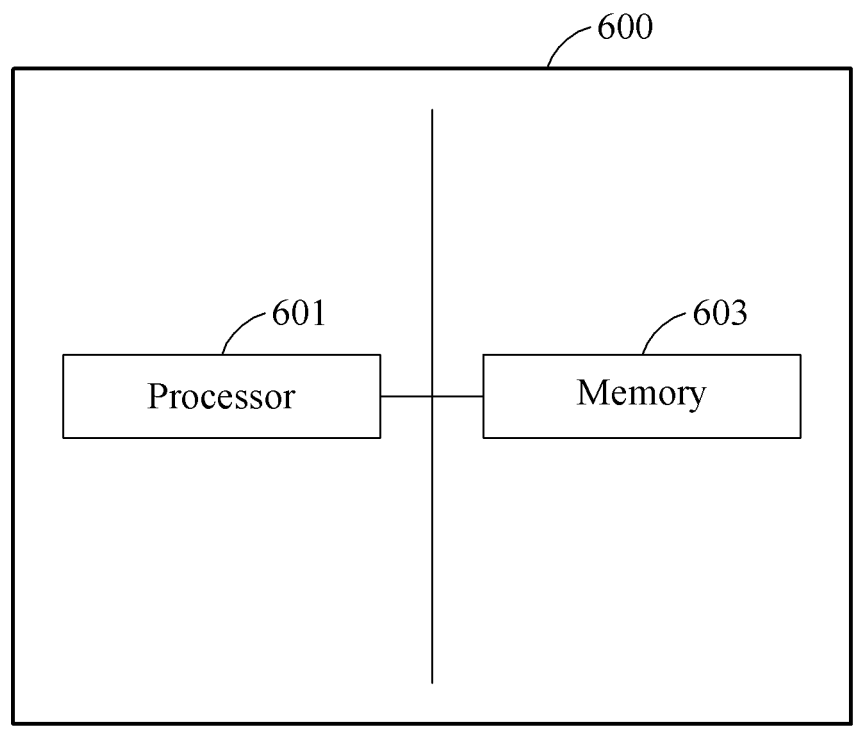
FIG. 6 illustrates an example gaze tracking apparatus, in accordance with one or more embodiments.

FIG. 6 illustrates an example gaze tracking apparatus, in accordance with one or more embodiments.

Referring to FIG. 6, a gaze tracking apparatus 600 includes at least one processor 601 and a memory 603. The processor 601 is a hardware configuration for performing general control functions to control operations of the apparatus. For example, the processor 601 may generally control the apparatus by executing instructions stored in the memory 603 of the apparatus, e.g., to execute any instructions to perform an operation described herein. The processor 601 may be implemented by, as non-limiting examples, a central processing unit (CPU), a graphics processing unit (GPU), an application processor (AP), a neural processing unit (NPU), and the like, which are provided in the apparatus.

The memory 603, which is hardware for storing various pieces of neural network data processed by the processor 601, may store, for example, parameters of a neural network including pieces of pruning data on the neural network, data sets to be input to the neural network, and the like. Furthermore, the memory 603 may store various applications to be driven by the processor 601, for example, applications for neural network pruning, neural network driving applications, drivers, and the like.

The memory 603 may include at least one of volatile memory or nonvolatile memory. The nonvolatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), and the like. The volatile memory may include dynamic RAM (DRAM), static RAM (SRAM), synchronous DRAM (SDRAM), phase-change RAM (PRAM), magnetic RAM (MRAM), resistive RAM (RRAM), ferroelectric RAM (FeRAM), and the like. Furthermore, the memory 603 may include at least one of hard disk drives (HDDs), solid state drive (SSDs), compact flash (CF) cards, secure digital (SD) cards, micro secure digital (Micro-SD) cards, mini secure digital (Mini-SD) cards, extreme digital (xD) cards, or Memory Sticks.

Referring to FIG. 6, in an example, the processor 601 obtains output position information from an input face image of a user using a neural network model. The processor 601 determines a position adjustment parameter for the user. The processor 601 predicts gaze position information of the user by adjusting the output position information based on the position adjustment parameter.

In another example, the processor 601 obtains output position information by inputting an input face image of a user to a neural network model. The processor 601 calculates a loss value of the output position information. The processor 601 calculates a reliability of the output position information based on the loss value. The processor 601 predicts gaze position information based on the reliability. The gaze tracking apparatus may correspond to any of the gaze tracking apparatuses described herein.

Figure 7:
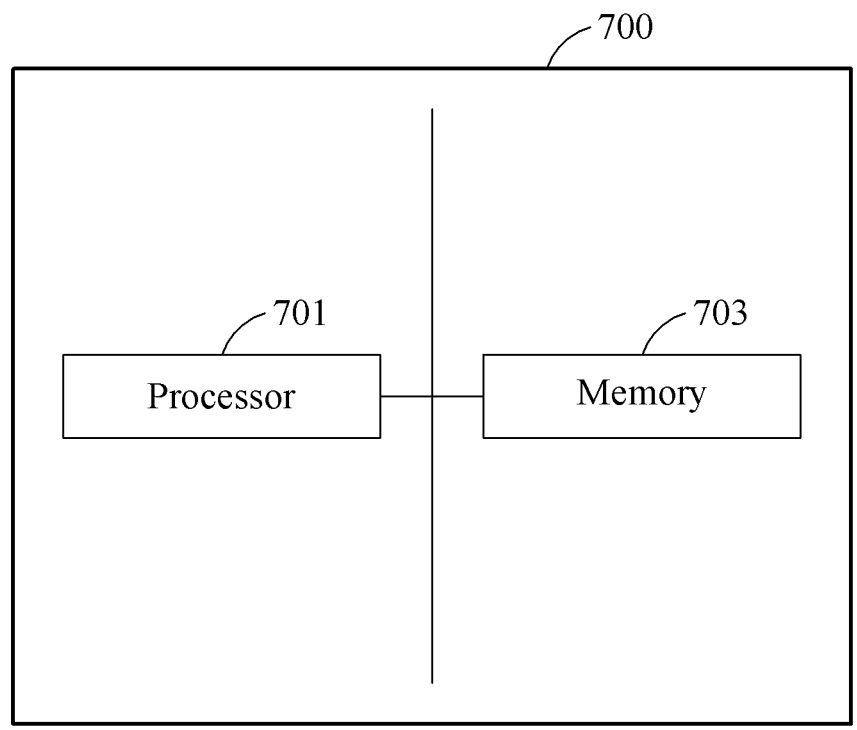
FIG. 7 illustrates an example gaze tracking neural network training apparatus, in accordance with one or more embodiments.

FIG. 7 illustrates an example gaze tracking neural network training apparatus, in accordance with one or more exemplary embodiments.

Referring to FIG. 7, a training apparatus 700 includes at least one processor 701 and a memory 703. The processor 701 is a hardware configuration for performing general control functions to control operations of the apparatus. For example, the processor 701 may generally control the apparatus by executing instructions stored in the memory 703 of the apparatus. The processor 701 may be implemented by, as non-limiting examples, a central processing unit (CPU), a graphics processing unit (GPU), an application processor (AP), a neural processing unit (NPU), and the like, which are provided in the apparatus.

The memory 703, which is hardware for storing various pieces of neural network data processed by the processor 701, may store, for example, parameters of a neural network including pieces of pruning data on the neural network, data sets to be input to the neural network, and the like. Furthermore, the memory 703 may store various applications to be driven by the processor 701, for example, applications for neural network pruning, neural network driving applications, drivers, and the like.

The memory 703 may include at least one of volatile memory or nonvolatile memory. The nonvolatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), and the like. The volatile memory may include dynamic RAM (DRAM), static RAM (SRAM), synchronous DRAM (SDRAM), phase-change RAM (PRAM), magnetic RAM (MRAM), resistive RAM (RRAM), ferroelectric RAM (FeRAM), and the like. Furthermore, the memory 703 may include at least one of hard disk drives (HDDs), solid state drive (SSDs), compact flash (CF) cards, secure digital (SD) cards, micro secure digital (Micro-SD) cards, mini secure digital (Mini-SD) cards, extreme digital (xD) cards, or Memory Sticks.

Referring to FIG. 7, the processor 701 may obtain a third training dataset by removing noise from a first training dataset. The processor 701 trains a neural network model by applying pruning and reinitiating based on the third training dataset. The neural network model may be trained such that a loss value of gaze position information predicted from a plurality of training face images included in the third training dataset is minimized or reduced. The processor 701 may be configured to perform any or any combination of training methods described herein.

The neural network apparatus, the gaze tracking apparatus, the training apparatus, the processor 601, the memory 603, the processor 701, the memory 703, and other apparatuses, devices, units, modules, and components described herein and with respect to FIGS. 1-7 are implemented as and by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. The one or more processors or computers may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIM D) multiprocessing, multiple-instruction single-data (MISD) multiprocessing, and multiple-instruction multiple-data (MIMD) multiprocessing.

The methods that perform the operations described in this application and illustrated in illustrated in FIGS. 1-7 are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software includes machine code that is directly executed by the one or more processors or computers, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), programmable read-only memory (PROM), electrically erasable programmable read-only memory (EEPROM), random-access memory (RAM), dynamic random-access memory (DRAM), static random-access memory (SRAM), flash memory, non-volatile memory, memory cards, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disk drives (HDD), solid-state disk drives (SSD), and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method comprising:
   obtaining, by one or more processors, output position information from an input face image of a user using a neural network model;
   determining, by the one or more processors, a position adjustment parameter for the user; and
   predicting, by the one or more processors, gaze position information of the user by adjusting the output position information based on the position adjustment parameter and a calculated reliability of the output position information,
   wherein the predicting of the gaze position information comprises:
   determining the output position information to be the gaze position information in response to the calculated reliability meeting a threshold; and
   determining, to be the gaze position information, output position information obtained from an input face image of a previous frame of the user in response to the calculated reliability failing to meet the threshold.

2. The method of claim 1, wherein the determining of the position adjustment parameter comprises:
   displaying an adjustment object;
   obtaining an adjusted face image of the user corresponding to the adjustment object;
   predicting adjusted position information from the adjusted face image using the neural network model; and
   determining the position adjustment parameter based on the adjusted position information and a position of the adjustment object.

3. A processor-implemented method comprising:
   obtaining, by one or more processors, output position information by inputting an input face image of a user to a neural network model;
   calculating, by the one or more processors, a loss value of the output position information;
   calculating, by the one or more processors, a reliability of the output position information based on the calculated loss value; and
   predicting, by the one or more processors, gaze position information of the user based on the calculated reliability,
   wherein the predicting of the gaze position information based on the calculated reliability comprises:
   determining the output position information to be the gaze position information in response to the reliability meeting a threshold; and
   determining, to be the gaze position information, output position information obtained from an input face image of a previous frame of the user in response to the reliability failing to meet the threshold.

4. The method of claim 3, wherein the predicting of the gaze position information based on the calculated reliability comprises:
   determining the gaze position information by adjusting the output position information in response to the calculated reliability failing to meet the threshold.

5. A processor-implemented method comprising:
   obtaining, by one or more processors, output position information by inputting an input face image of a user to a neural network model;

calculating, by the one or more processors, a loss value of the output position information;

calculating, by the one or more processors, a reliability of the output position information based on the calculated loss value; and predicting, by the one or more processors, gaze position information of the user based on the calculated reliability, wherein the calculating of the reliability of the output position information based on the calculated loss value comprises:

determining at least two perturbations dependent on the calculated loss value;

obtaining at least two adjusted face images respectively corresponding to the at least two perturbations by respectively adjusting the input face image;

obtaining at least two sets of perturbed position information by inputting the at least two adjusted face images to the neural network model; and calculating the reliability of the output position information based on the at least two sets of perturbed position information.

6. The method of claim 5, wherein the calculating of the reliability of the output position information based on the at least two sets of the perturbed position information comprises:

calculating a standard deviation based on the at least two sets of perturbed position information; and determining an inverse value of the standard deviation to be the reliability.

7. The method of claim 5, wherein the determining of the at least two perturbations comprises:

calculating a loss value in each of at least two directions of the output position information; and determining the at least two perturbations in the at least two directions based on the loss value in each of the at least two directions.

8. The method of claim 5, wherein the determining of the at least two perturbations comprises:

determining the at least two perturbations based on at least two perturbation coefficients.

9. A processor-implemented method comprising:

obtaining, by one or more processors, output position information by inputting an input face image of a user to a neural network model;

calculating, by the one or more processors, a loss value of the output position information;

calculating, by the one or more processors, a reliability of the output position information based on the calculated loss value; and predicting, by the one or more processors, gaze position information of the user based on the calculated reliability, wherein the obtaining of the output position information comprises:

obtaining a partial face image from the input face image as a full face image;

obtaining the output position information and partial position information by respectively inputting the input face image and the partial face image to the neural network model;

determining at least two perturbations for each of a loss value of the output position information and a loss value of the partial position information;

obtaining at least four adjusted face images by adjusting the input face image and the partial face image using the at least two perturbations corresponding to the loss value of the output position information and the at least two perturbations corresponding to the loss value of the partial face image;

obtaining at least four sets of perturbed position information by inputting the at least four adjusted face images to the neural network model; and calculating the reliability of the output position information based on the at least four sets of the perturbed position information.

10. A non-transitory computer-readable storage medium storing instructions that, when executed by a processor, cause the processor to perform the gaze tracking method of claim 3.

11. An apparatus comprising:

one or more processors configured to:

obtain output position information from an input face image of a user using a neural network model;

determine a position adjustment parameter for the user; and predict gaze position information of the user by adjusting the output position information based on the position adjustment parameter and a calculated reliability of the output position information, wherein, for the predicting of the gaze position information, the one or more processors are configured to:

determine the output position information to be the gaze position information in response to the calculated reliability meeting a threshold; and determine, to be the gaze position information, output position information obtained from an input face image of a previous frame of the user in response to the calculated reliability failing to meet the threshold.

12. The apparatus of claim 11, further comprising a memory storing instructions that, when executed by the one or more processors, configure the one or more processors to perform the obtaining of the output position information, the determining a position adjustment parameter, and the predicting gaze position information.

* * * * *